United States Patent [19]
Feast et al.

[11] 3,966,661
[45] June 29, 1976

[54] PREPARATION OF LATICES

[75] Inventors: Alan Arthur John Feast, Eastleigh; Charles Mack Scott, Southampton, both of England

[73] Assignee: The International Synthetic Rubber Company, Limited, England

[22] Filed: July 31, 1974

[21] Appl. No.: 493,612

[30] Foreign Application Priority Data

Aug. 3, 1973 United Kingdom............... 36884/73

[52] U.S. Cl..................... 260/29.7 H; 260/29.7 SQ; 260/29.7 T; 260/29.7 P; 260/95 C
[51] Int. Cl.² ........................ C08L 9/04; C08L 9/08
[58] Field of Search................ 260/29.7 H, 29.7 SQ, 260/29.7 P, 29.7 T, 95 C

[56] References Cited
UNITED STATES PATENTS

| | | | |
|---|---|---|---|
| 2,458,456 | 1/1949 | Wolk................................. | 260/95 C |
| 2,872,438 | 2/1959 | Carroll.............................. | 260/95 C |
| 3,055,855 | 9/1962 | Anderson....................... | 260/29.7 H |
| 3,409,569 | 11/1968 | Lane.............................. | 260/29.7 H |
| 3,784,498 | 1/1974 | Ceska............................ | 260/29.7 H |
| 3,793,244 | 2/1974 | Megee........................... | 260/29.7 T |
| 3,833,532 | 9/1974 | Bennett......................... | 260/29.7 SQ |
| 3,865,772 | 2/1975 | Hulyalkar ...................... | 260/29.7 H |
| 3,872,037 | 3/1975 | MacLeod ...................... | 260/29.7 T |

*Primary Examiner*—Paul R. Michl
*Attorney, Agent, or Firm*—Cushman, Darby & Cushman

[57] ABSTRACT

Carboxylated latices are prepared continuously under substantially constant temperature conditions in a total reaction time of 6 to 10 hours using two or more reactors at controlled temperatures. The monomers and the reaction ingredients which are specified are all supplied to the first reactor and no additions are made to the subsequent reactors. The process uses an alkali metal or ammonium alkyl aryl sulphonate emulsifier, an alkali metal or ammonium electrolyte and a source of peroxydisulphate ion. The carboxylated latices obtained are particularly useful for carpet backing and paper coating applications.

20 Claims, 1 Drawing Figure

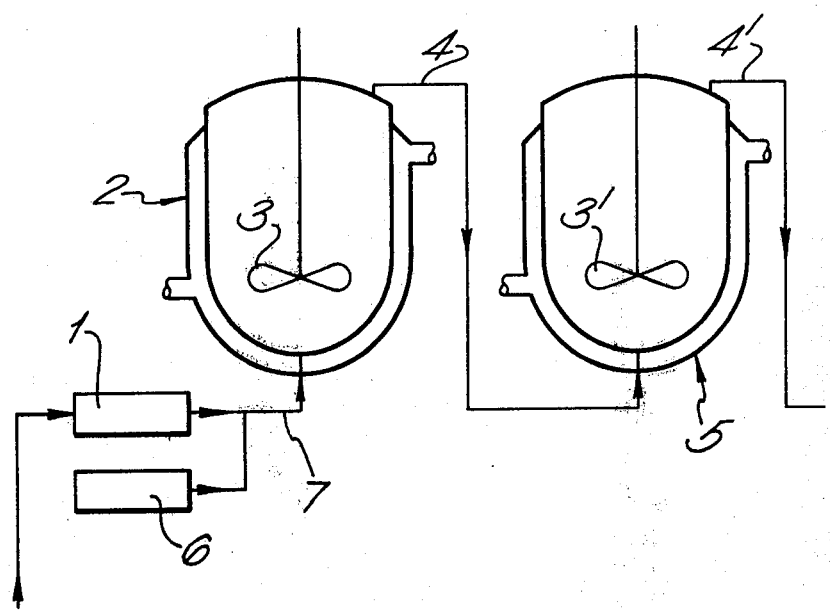

PREPARATION OF LATICES

This invention relates to the preparation of latices by a continuous process. In particular it relates to the preparation of carboxylated latices which are latices produced by the polymerisation of monomers comprising at least one conjugated diene, at least one non carboxylic comonomer and at least one ethylenically unsaturated carboxylic acid.

Carboxylated latices are well known latices which hitherto have been prepared on a commercial scale by batch processes with a reaction time of 15 hours to 20 hours. Such batch processes have required special procedures in order to obtain satisfactory properties in the final latex. For example one process requires a prepolymerisation to a seed latex which is then passed to the reactor where the majority of the polymerisation takes place. In another process, monomer and/or emulsifier are added in increments as polymerisation proceeds. The disadvantages of batch processes for the preparation of carboxylated latices are, amongst others, the comparatively long reaction time involved and the special procedures required, quite apart from the well known disadvantages of batch reactions in general.

According to our invention we provide a continuous process for the preparation of carboxylated latices comprising:

1. continuously supplying to a first reactor maintained at a temperature of 70° to 85°C, monomers comprising at least one conjugated diene, at least one non-carboxylic comonomer and at least one ethylenically unsaturated carboxylic acid; and reaction ingredients comprising a source of peroxydisulphate ion, an alkali metal or ammonium alkyl aryl sulphonate emulsifier, an alkali metal or ammonium electrolyte, or the reaction product of such an electrolyte with an ethylenically unsaturated carboxylic acid, and water and polymerising the monomers for an average residence time of 3 to 5 hours, 2. continuously removing reaction mixture from the first reactor to at least one subsequent reactor maintained at 85° to 100°C in which polymerisation is continued; and 3. continuously recovering the carboxylated latex from the last reactor.

In a preferred embodiment of the invention the continuous process is carried out in two agitated pressure reactors, with a total average residence time of 6 to 10 hours. By the process of the invention, and especially when using the preferred conditions herein described, it is possible to prepare carboxylated latices of excellent quality on a commercial scale with virtually no coagulum or build up of polymer on the reactor walls using very short reaction times. These short reaction times contrast very favourably with the reaction time of 15 to 20 hours required by batch processes heretofore employed. Further all the reaction ingredients are supplied to the first reactor on a continuous basis and no addition of reaction ingredients is required to the second or subsequent reactors.

The monomers preferably comprise 0.1 to 10% by weight of the total of alpha beta ethylenically unsaturated carboxylic acid(s) and 30 to 80% by weight of non-carboxylic comonomer(s), the balance being conjugated diene. The ethylenically unsaturated carboxylic acid used may be a mono carboxylic or a polycarboxylic acid or a mixture of such acids. Preferably the acids have 2 to 10 chain carbon atoms. Examples of preferred monocarboxylic acids are acrylic acid, methacrylic acid and crotonic acid. Examples of polycarboxylic acids are maleic acid, fumaric acid and particularly itaconic acid which are preferred and 3-butene 1,2,3-tricarboxylic acid. Substituted monocarboxylic acids and substituted polycarboxylic acids may be used if desired. The amount of carboxylic acid used is preferably 0.5 to 5% by weight based on total monomers. The carboxylic acid(s) used is preferably supplied to the first reactor in the free acid form. However a portion of acid may be premixed with the electrolyte and supplied to the reactor as the salt so obtained. In the case of a polycarboxylic acid the salt may be the salt obtained by partial neutralisation or complete neutralisation as desired. In such cases the electrolyte salt supplied may be e.g. potassium itaconate or potassium methacrylate. Where the electrolyte is supplied to the reactor as the salt of an unsaturated carboxylic acid this acid need not be the same as that used as the monomer. Thus potassium methacrylate may be supplied to a reaction employing itaconic acid as comonomer and vice versa.

The conjugated diene preferably has 4 to 10 carbon atoms, typically 4 to 6 carbon atoms. Examples are butadiene, isoprene, 2,3 dimethyl butadiene, butadiene being particularly suitable. Substituted conjugated dienes may be used if desired (e.g. chloro or cyano butadiene). The non-carboxylic comonomer may be a vinyl aromatic compound such as styrene, which is preferred, or an aliphatic monomer such as an unsaturated nitrile, for example acrylonitrile or methacrylonitrile, or an ester of an unsaturated monocarboxylic or polycarboxylic acid with alcohols which have from 1 to 10 carbon atoms, e.g. methyl acrylate, ethyl acrylate, methyl methacrylate, hexyl acrylate, 2-ethyl hexyl acrylate. Ethyl acrylate and methyl methacrylate are preferred. Substituted products of the above mentioned non-carboxylic comonomers may be used if desired, e.g. hydroxy substituted and halo substituted compounds. Mixtures of non-carboxylic comonomers may be used if desired. The amount of comonomer is preferably 30 to 80% by weight, for example 40% to 60% by weight based on total monomers.

The process of the invention is particularly suitable for the copolymerisation of butadiene, styrene and one or more unsaturated acids with or without other non-carboxylic comonomers. The monomers may be supplied separately to the first reactor or in admixture. Preferably the acidic component is supplied as a dilute solution in water, (e.g. 2 to 10% by weight).

The first reactor is maintained at 70° to 85°C, preferably 75° to 80°C and subsequent reactors are maintained at 85° to 100°C, preferably 90° to 95°C. The reactors are equipped with jackets to control the temperature within the range specified and polymerisation proceeds in each under substantially constant temperature conditions. Preferably the reactors are lined with e.g. glass.

An alkali metal or ammonium alkyl aryl sulphonate emulsifier and an alkali metal or ammonium electrolyte are continuously supplied to the reactor together with a source of peroxy disulphate ion. Examples of suitable sulphonates are sodium or potassium salts of alkyl aryl sulphonic acids having up to twenty carbon atoms for example, sodium dodecyl benzene sulphonate or sodium dibutyl naphthalene sulphonate, and their potassium or ammonium equivalents. Sodium toluene sulphonate, which is not an emulsifier, is useful as an auxiliary. Sodium dodecyl benzene sulphonate or a mixture thereof with sodium toluene sulphonate are especially suitable. The amount of emulsifier used is preferably 1.0 to 3.0 parts by weight per hundred parts of monomer (phm). Preferred amounts are 1.2 to 2.0 phm or 1.5 to 2.5 where the above mentioned mixture is used. The alkali metal or ammonium electrolyte is preferably an acetate, carbonate, hydroxide, chloride or phosphate. Ammonium, sodium and particularly potassium carbonate are most preferred electrolytes. The amount of electrolyte used is preferably 0.2 to 0.7 phm, more preferably 0.4 to 0.6 phm. Peroxy disulphate ion is generally produced by the thermal decomposition of the potassium, sodium or ammonium salt e.g. potassium persulphate. Thus initiation may be achieved by continuously supplying potassium, sodium or ammonium persulphate to the reactor. Ammonium persulphate is preferred because of its greater solubility in water. The amount of initiator required in the case of potassium or ammonium persulphate is generally up to 1.5 phm, preferably 0.7 to 1.0 phm, in the case of potassium persulphate.

It is generally possible to use reaction ingredients wherein the emulsifier electrolyte and initiator are each the ammonium salt (i.e. an all ammonium cation system), the sodium salt (i.e. an all sodium cation system) or the potassium salt (i.e. an all potassium cation system). However it is particularly desirable to have all three cations (ammonium, sodium and potassium) in the reaction system and preferable to maintain the ammonium : potassium, ammonium : sodium and/or potassium : sodium ratio within the limits specified below to obtain optimum conversion at minimum coagulum level at the desired surface tension. Thus the optimum ammonium to potassium cation ratio is 1 : 10 to 10 : 1, the optimum ammonium to sodium cation ratio is 9 : 1 to 1 : 9 and the potassium to sodium cation ratio is preferably 5 : 1 to 1 : 5 (all expressed on an equivalents basis). Preferably the total of ammonium, sodium and/or potassium cations in any particular formulation is in the range 15 to 28 milliequivalents, more preferably 17 to 24, per hundred parts of monomer.

It has been found particularly desirable to use ammonium persulphate as the initiator and source of ammonium ions in the reaction system, with potassium carbonate as the alkali metal carbonate and a sodium alkyl aryl sulphonate, especially sodium dodecyl benzene sulphonate, as emulsifier. With this system the optimum amount of ammonium persulphate required is 0.7 to 1.0 phm, preferably 0.8 to 0.9 phm; the optimum amount of potassium carbonate is 0.2 to 0.7 phm, preferably 0.4 to 0.6 phm and the optimum amount of sodium alkyl aryl sulphonate is 1.0 to 3.0 phm, preferably 1.2 to 1.8 phm (or 1.2 to 2.5 where a mixture with sodium toluene sulphonate is used).

As is usual in the preparation of latices, it is desirable to include in the reaction mixture a molecular weight modifier such as a mercaptan, for example $t$-dodecyl mercaptan or $n$-dodecyl mercaptan, the amount of such mercaptan being in the range 0.2 to 1.0 phm, e.g. 0.6 to 1.0 phm in the case of $t$-dodecyl mercaptan. Preferably the amount of modifier is such as to give a Mooney Viscosity (ML 1+4) of 80 to 120, more preferably 90 to 110. A chelating agent such as ethylene diamine tetra acetic acid (EDTA), or a salt thereof, is desirably included in the reaction mixture in an amount of e.g. 0.01 to 1 phm, preferably 0.01 to 0.2 phm.

The emulsifier, carbonate, initiator and modifier may be continuously supplied to the reactor separately or in admixture. It is preferable however to prepare separate aqueous solutions of (1) the emulsifier, carbonate and chelating agent (2) the carboxylic acid at a concentration of e.g. about 10%, (3) initiator (concentrations about 5% by weight) and to supply these with the modifier to the reactor. The total amount of water added to the reactor is preferably such as to give a concentration in the first reactor of material other than water of 50 to 58% by weight.

As mentioned above, the continuous process is preferably carried out in two agitated reactors, the first reactor being maintained at 70° to 85°C and the second at 85° to 100°C. The reactors are preferably agitated pressure reactors and they need not be of the same volume. Preferably the first reactor is maintained at 75° to 80°C and the second at 90° to 95°C. In this preferred embodiment employing two reactors, the monomers, the carboxylic acid in solution, the solution of emulsifier, carbonate and chelating agent, and the modifier are supplied at the appropriate charge rate so that the average residence time in the reactor is 3 to 5 hours. The initiator solution is supplied to the base of the reactor. Reaction mixture is continuously removed from the first reactor and supplied continuously to the second reactor in which reaction is continued. Unlike some processes for the preparation of latices, no other addition to the second reactor (or any subsequent reactors) is required. Good agitation is maintained in the reactor and equilibrium mixture is continuously removed from the second reactor. The latex product recovered in the stripper, where unreacted monomers are removed. Antioxidant(s) and any other materials desired, e.g. bactericide, may be added to the latex prior to storage. The conversion of monomer to polymer achieved is preferably at least 95%. By appropriate adjustments to the amount and type of the monomers and reaction ingredients supplied to the first reactor and to the reaction conditions carboxylated latices having optimum viscosity, surface tension, molecular weight and number average particle size characteristics can be obtained so that the latices have excellent properties for the conventional applications of such latices. Thus carboxylated latices for carpet backing and paper coating applications may readily be obtained in a reaction time of 6 to 10 hours.

The following examples illustrate the process of the invention:

EXAMPLE 1

In this example the apparatus illustrated in FIG. 1 of the accompanying drawings, was used.

Referring to FIG. 1, an in-line precooler, 1, is connected via supply line, 7, to the base of a first closed reactor, 2, equipped with a jacket for the circulation of coolant medium, an agitator 3, and an overflow outlet, 4. The overflow outlet, 4, is connected to the base of a second similar jacketed reactor, 5, also equipped with an agitator, 3, and an overflow outlet, 4.

A source of initiator, 6, is connected to the reactor supply line, 7, at a point between the precooler, 1, and first reactor, 2. The monomers, emulsifier, electrolyte, water and other reaction ingredients are supplied to the first reactor, 2, through the precooler 1. In the example, the following ingredients were used in the relative amounts shown in which parts by weight are quoted. This formulation is a preferred formulation for the continuous manufacture of carboxylated latices especially suitable in carpet backing applications by the process of the present invention.

| 1. Monomers: | Styrene | 50.00 |
| --- | --- | --- |
| | Butadiene | 48.00 |
| | Itaconic Acid | 2.0 |
| 2. Emulsifier: | Sodium dodecyl benzene sulphonate* | 1.5 |
| Carbonate: | Potassium Carbonate | 0.6 |
| Chelating Agent: | Sodium Salt of EDTA** | 0.03 |
| 3. Initiator: | t-Dodecyl Mercaptan | 0.8 |
| 4. Modifier: | Ammonium Persulphate | 0.85 |
| Water to 53% total solids (matter other than water) | | |

*ARYLAN SC30 - Lankro Chemicals Limited
**DETAREX F - F.W. Berk Limited

In this formulation all three cations (ammonium potassium and sodium) are present. The ammonium : potassium cation ratio is 1 : 2.5, the ammonium : sodium cation ratio is 1 : 1.3 and the potassium : sodium cation ratio is 3.4 : 1 (on a weight basis) or on an equivalents basis respectively 1 : 1.2, 1.7 : 1 and 2 : 1.

The continuous process was started by first carrying out a batch reaction in the first reactor. Initiation was at 45° to 50°C.

The monomers, emulsifier/carbonate mixture, modifier and water were fed to a pump head and pumped through a common line to the in-line precooler. The temperature of the mixture leaving the precooler was 25° to 30°C. Ammonium persulphate was added as a solution and the total reaction mixture continuously supplied to the base of the first reactor. After the desired residence time, determined by the pumping rate and working volume of the reactor, the reaction mixture was passed to the second reactor whence the latex reaction produce was passed, via the overflow outlet and connecting line, to the stripper where residual monomers were removed.

The average residence time for each reactor was 4.5 hours and the temperatures were 80 to 85°C for the first reactor and 85 to 90°C for the second reactor.

The latex pH was adjusted in the stripper to 9.0 with ammonia and tetrasodium pyrophosphate and defoamer added before stripping.

After stripping the latex was pumped to storage, where the pH was adjusted to 9.0 to 9.5 with ammonia and antioxidant and bactericide were added.

| Typical latex properties were: | |
| --- | --- |
| Total solids content | 51 to 55 |
| pH | 9.0 to 9.5 |
| Surface tension | 51 to 53 dynes/cm. |
| Brookfield viscosity (Spindle 2 at 20 rpm) | 250 to 300 cps. |
| Number average particle size (diameter) diameter | 1700-1900 |
| Residual styrene | less than 0.1% |
| Coagulum content (85 mesh) | 0.3% |

An uncured film is water dispersible and carpet backing properties are comparable to those of other similar commercial products.

EXAMPLE 2

The formulation in Example 1 was varied to examine the effect of various cation ratios. In place of potassium carbonate in the amount shown in Example 1, potassium carbonate, ammonium carbonate and sodium carbonate were used in the p.h.m. (parts per 100 of monomer) shown below. The modifier amount was 0.25 p.h.m. The cation ratios are quoted in each case, calculated on an equivalents basis.

| 1. | $K_2CO_3$ | $(NH_4)_2CO_3$ | $K^+/NH_4^+$ |
| --- | --- | --- | --- |
| | 0.42 | 0.06 | 10/1* |
| | 0.19 | 0.24 | 2/1* |
| | 0.34 | 0.12 | 1/2 |
| | 0.09 | 0.29 | 1/10 |

*using potassium persulphate (1 p.h.m.) in place of ammonium persulphate.

| 2. | $(NH_4)_2CO_3$ | $Na_2CO_3$ | $NH_4^+/Na^+$ |
| --- | --- | --- | --- |
| | 0.43 | 0.06 | 3/1 |
| | — | 0.54 | 1/2 |

| 3 | $K_2CO_3$ | $Na_2CO_3$ | $K^+/Na^+$ |
| --- | --- | --- | --- |
| | 0.38 | — | 3/1** |
| | 0.09 | 0.23 | 1/1** |
| | — | 0.35 | 1/2*** |

*using 2.0 p.h.m. of emulsifier.
**using potassium persulphate (1 phm) as initiator.

In each case carboxylated latices having satisfactory viscosity and surface tension characteristics with little or no coagulum were obtained. Outside these ranges, latices of less satisfactory properties may be obtained.

EXAMPLE 3

In order to test the effect of electrolyte type various other sodium, potassium and ammonium salts were tried (at a $Na^+/NH_4^+$ cation ratio of 2 : 1 for sodium salts and $K^+/NH_4^+$ cation ratio of 1 : 1 otherwise) in place of the carbonates used in Example 2. Satisfactory carboxylated latices were obtained using acetate, hydroxide and chloride as anion, although some anion/cation combinations gave higher coagulum level than others under the conditions used.

EXAMPLE 4

Variation in the amount of emulsifier used in the formulaion of Example 1 within the range 1 to 3 p.h.m. was examined and satisfactory carboxylated latices were obtained in all cases. A particularly satisfactory latex was obtained using a combination of 2 p.h.m. of sodium dodecyl benzene sulphonate and 0.5 p.h.m. of sodium toluene sulphonate (Eltesol ST 90 — Marchon Products).

EXAMPLE 5

Variation in the non-carboxylic comonomer (styrene) in the formulation in Example 1 was tried using various ratios of styrene (0 – 50 parts) and acrylonitrile (0 – 45 parts). Stable latices were obtained having a variety of physical properties.

EXAMPLE 6

Variation in the carboxylic acid monomer in the formulation in Example 1 was tried. Acidic monomers employed were acrylic acid, methacrylic acid, fumaric acid, maleic acid, crotonic acid and 3 butene 1,2,3 tricarboxylic acid and combinations thereof. Stable latices were obtained having a variety of physical properties dependent upon the acid employed.

We claim:
1. A continuous process for the preparation of carboxylated latices comprising:
   1. Continuously supplying to a first reactor maintained at a temperature of 70° to 85°C, monomers consisting of at least one conjugated diene, at least one non-carboxylic comonomer which is a vinyl aromatic, an unsaturated nitrile or an ester of an unsaturated carboxylic acid with an alcohol having 1 to 10 carbon atoms and 0.1 to 10% of at least one ethylenically unsaturated carboxylic acid; and reaction ingredients comprising a source of peroxy disulphate ion, 1.0 to 3 parts by weight per hundred parts of monomer of an alkali metal or ammonium alkyl aryl sulphonate emulsifier, an alkali metal or ammonium electrolyte, or the reaction product of such an electrolyte with an ethylenically unsaturated carboxylic acid, and water; and polymerising the monomers for an average residence time of 3 to 5 hours.

2. Continuously removing reaction mixture from the first reactor to at least one subsequent reactor maintained at 85° to 100°C in which polymerisation is continued; and 3. Continuously recovering the carboxylated latex from the last reactor.

2. A process according to claim 1 carried out in two agitated pressure reactors the total average residence time being 6 to 10 hours.

3. A process according to claim 1 wherein the conjugated diene has 4 to 10 carbon atoms.

4. A process according to claim 3 wherein the diene is butadiene or isoprene.

5. A process according to claim 1 wherein the non carboxylic comonomer is styrene, acrylonitrile, methacrylonitrile, ethyl acrylate or methyl methacrylate or hydroxy or halo substituted derivatives thereof or a mixture of two or more such comonomers.

6. A process according to claim 1 wherein the carboxylic acid monomer used has 2 to 10 chain carbon atoms.

7. A process according to claim 6 wherein the carboxylic acid monomer is acrylic acid, methacrylic acid, crotonic acid, maleic acid, fumaric acid, itaconic acid, 3-butene 1,2,3 tricarboxylic acid or a mixture of two or more such acids.

8. A process according to claim 1 wherein the emulsifier is sodium dodecyl benzene sulphonate, sodium dibutyl naphthalene sulphonate, the potassium or ammonium equivalents or a mixture of one or more of such sulphonates with sodium toluene sulphonate.

9. A process according to claim 1 wherein the electrolyte is an acetate, carbonate, hydroxide, chloride or phosphate.

10. A process according to claim 9 wherein the electrolyte is potassium, sodium or ammonium carbonate.

11. A process according to claim 1 wherein the amount of electrolyte is 0.2 to 0.7 parts by weight per hundred parts of monomer.

12. A process according to claim 1 wherein the source of peroxy disulphate ion is potassium persulphate or ammonium persulphate.

13. A process according to claim 1 wherein the source of peroxy disulphate ion is used in an amount of up to 1.5 parts by weight per hundred parts by weight of monomer.

14. A process according to claim 1 wherein potassium, sodium and ammonium cations are all present in the reaction mixture.

15. A process according to claim 14 wherein the ammonium to potassium cation ratio is 1 : 10 to 10 : 1, the ammonium to sodium cation ratio is 9 : 1 to 1 : 9 and the potassium to sodium cation ratio is 5 : 1 to 1 : 5 (all calculated on an equivalents basis).

16. A process according to claim 1 wherein the first reactor is at 75° to 80°C and subsequent reactors at 90° to 95°C.

17. A continuous process for the preparation of carboxylated latices consisting of 1. Continuously supplying to a first reactor maintained at 70° to 85°, monomers comprising butadiene, 30 to 80% by weight of a vinyl aromatic, an unsaturated nitrile and/or an ester of an unsaturated carboxylic acid with alcohol having from 1 to 10 carbon atoms, and 0.1 to 10% by weight of an ethylenically unsaturated carboxylic acid and reaction ingredients comprising up to 1.5 parts by weight per hundred ingredients comprising up to 1.5 parts by weight per hundred parts of monomer (phm) of potassium persulphate or ammonium persulphate, 1.0 to 3.0 phm of sodium dodecyl benzene sulphonate or a mixture thereof with sodium toluene sulphonate, 0.2 to 0.7 phm of potassium, sodium or ammonium carbonate or the reaction product thereof with an ethylenically unsaturated carboxylic acid, and water: and polymerising the monomers for an average residence time of 3 to 5 hours.

2. Continuously removing reaction mixture from the first reactor to a second reactor maintained at 85° to 100°C in which polymerisation is continued; and 3. Continuously recovering the carboxylated latex from the second reactor.

18. A process according to claim 1 wherein the first reactor is at 75° to 80°C.

19. A process according to claim 1 wherein the non-carboxylic monomer is present in an amount of 30 to 80%.

20. A process according to claim 1 wherein the second reactor is maintained at a higher temperature than the first reactor.

* * * * *